United States Patent [19]
Schwartz

[11] 3,719,183
[45] March 6, 1973

[54] METHOD FOR DETECTING BLOCKAGE OR INSUFFICIENCY OF PANCREATIC EXOCRINE FUNCTION

[76] Inventor: Howard S. Schwartz, 4 Sador Lane, Yonkers, N.Y.

[22] Filed: March 5, 1970

[21] Appl. No.: 22,107

Related U.S. Application Data

[63] Continuation of Ser. No. 607,441, Jan. 5, 1967, abandoned.

[52] U.S. Cl. ................................128/2 R, 128/2 P
[51] Int. Cl. .................................................A61b 5/00
[58] Field of Search.........128/2 P, 2 R, 2.1 R; 424/9, 424/20, 35, 36, 37

[56] References Cited

UNITED STATES PATENTS

| | | |
|---|---|---|
| 2,958,781 | 11/1960 | Marchal et al. ......................128/2 P |
| 3,340,866 | 9/1967 | Noller ..................................128/2 P |
| 3,216,411 | 11/1967 | Watanuki et al. ...................128/2 P |

FOREIGN PATENTS OR APPLICATIONS

| | | |
|---|---|---|
| 1,248,684 | 11/1960 | France..............................128/2.1 R |

OTHER PUBLICATIONS

Noller, "International Conference on Medical Electronics," Paris, June 25, 1959, pp. 296–299

Primary Examiner—William E. Kamm
Attorney—Hopgood and Calimafde

[57] ABSTRACT

A process for determining internal blockage to pancreatic enzyme flow in which an electronic capsule transponder has an insulative coating of material dissolvable by the action of predetermined enzyme secretions. When the coating is dissolved, the transponder is coated with the enzyme flow. The transponder may be swallowed and a stimulant may be applied to the body to selectively increase enzyme secretions.

7 Claims, 5 Drawing Figures

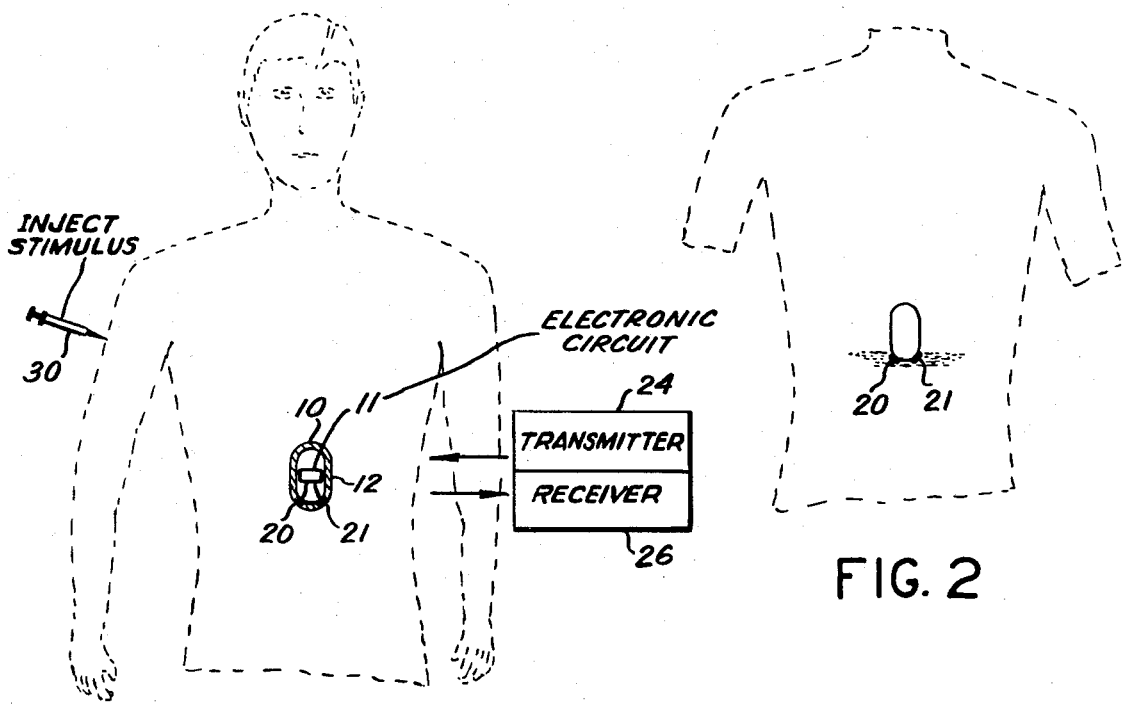
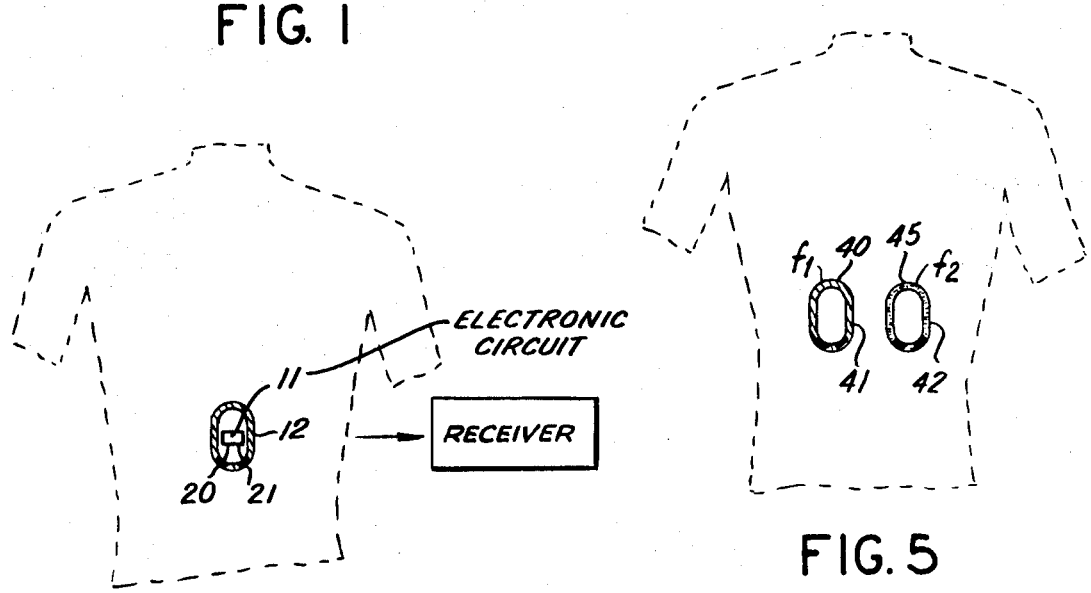
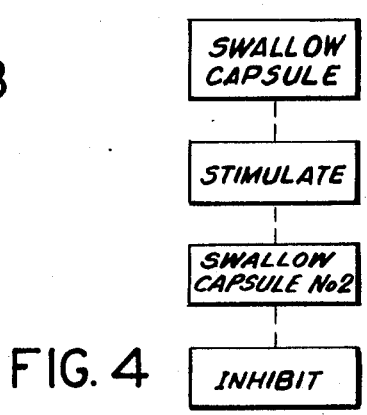
FIG. 1
FIG. 2
FIG. 3
FIG. 4
FIG. 5
INVENTOR
HOWARD S. SCHWARTZ

METHOD FOR DETECTING BLOCKAGE OR INSUFFICIENCY OF PANCREATIC EXOCRINE FUNCTION

This case is a continuation of application Ser. No. 607,441, filed Jan. 5, 1967 and now abandoned.

This invention relates to a system and method for detecting deficient intestinal enzymatic function and, more particularly, relates to a system for determining blockage of pancreatic exocrine function or insufficiency of this system.

One of the most difficult diagnoses to establish in medicine is early pancreatitis, pancreatic tumors, or mild obstruction to the outflow of pancreatic digestive enzymes.

Neither blood studies, urinalysis nor radiological examinations are adequate in arriving at such diagnoses.

Direct intubation of the intestine has been employed in an attempt to elucidate these illnesses, but biological variability and technical difficulties in positioning the tubes has led to much discrepancy between the data observed and the actual clinical significance. It is unfortunately too frequent that patients are subjected to surgical exploration of the pancreas only to find the organ normal. Other times, surgical biopsies of the pancreas are performed to elucidate the illness, only to result in post-operative debilitating fistulas from the surgery. In view of the hazards listed above, many patients do not undergo surgery soon enough but wait until the illness is far advanced and beyond the capacity of our therapies to cure.

It is an object of my invention to provide a simple and effective technique for determining the condition of various body organs in their dynamic state.

It is a further object of this invention to provide a new test to determine the effectiveness of the pancreas, liver and intestines.

It is still another object of this invention to use internal body secretions as part of a conductive circuit.

It is another object to provide a simple transmitter or transponder for swallowing and detecting a physiological condition.

In my invention, the patient swallows an electronic capsule having appropriate electrical circuitry but which is inoperable because of a pair of open connectors. The layer surrounding the capsule is formed by an insulative, "test-digestible" substance, e.g., sugar regulated at a suitable pH. External to the body is an appropriate sensing means, i.e., transmitting and receiving circuitry to determine and detect the state of the electronic capsule.

After the patient swallows this device, he is injected with a stimulus such as urecholine, pancreozymin, or secretin, which immediately stimulates the flow of pancreatic fluid and its exocrine digestive enzymes. The amylolytic enzyme, amylase, secreted in the pancreatic juice, will digest the test carbohydrate which covers the area surrounding the open connectors of the electronic capsule. As digestion proceeds in the small intestine, the two electrodes comprising the open circuit are then in contact with pancreatic and intestinal fluid which has sufficient ions (sodium potassium, chloride, or bicarbonate ions) to provide a conductive path to thereby close and complete the circuitry of the capsule. The capsule's condition can then be detected by the external sensing means.

The above-mentioned and other features and objects of this invention and the manner of attaining them will become more apparent and the invention itself will be best understood by reference to the following description of an embodiment of the invention taken in conjunction with the accompanying drawing, wherein:

FIG. 1 is a diagram of my invention.

FIG. 2 is a diagram showing the condition of the capsule after the outer layer is dissolved.

FIG. 3 is a diagram of an alternate embodiment.

FIG. 4 is a flow chart illustrating the series of steps in one of my embodiments.

FIG. 5 is a diagram of an alternate embodiment.

Prior patents to Marchal U.S. Pat. Nos. 2,958,781 and Bieganski 3,051,896, have established that radio telemetry from within the body is feasible. Nagumo et al, U.S. Pat. No. 3,229,684 shows that the pill swallowed by the user does not have to have its own power circuitry, and may be a passive transponder.

Referring now to FIG. 1, there is shown a capsule 10 having internal electronic circuitry 11 and an outer layer 12 of digestible material. The electronic circuit is essentially an oscillator or other resonant device having, for example, a negative resistance or a positive feedback path, and a radiating element responsive to the oscillations, as those skilled in the art will recognize. Therefore, the circuitry may be of the passive type, without a power supply, as illustrated in the Nagumo patent. Power supplies of small size are now well known and may be used alternatively in an active device. In other respects, the electronic aspects of the circuit 11 are known. The circuit, however, has a condition, for example, an open circuit which renders it in a first state. When an open circuit exists, for example, the circuit will be inoperative. The open circuit is defined by the contacts 20 and 21. When a conductive path exists across contacts 20 and 21, the electronic circuit will operate in a different mode. For example again, if the circuit is inoperative because of an open circuit, it will become operative when the conductive path is closed.

There is shown a transmitter 24 and a receiver 26. When a conductive path is established between the contacts 20 and 21, transmitted energy in the nature of radiated signals will be received and retransmitted from the capsule 10 to be identified by the receiver 26. Receiver 26 is merely a frequency-responsive indicator which detects the presence of a response from capsule 10. In this case, capsule 10 operates as a transponder. As illustrated in FIG. 2, when the outer layer 12 is dissolved, the internal bathing fluid comprising internal secretions within the body, surrounds the two contacts 20 and 21 to provide a conductive path between the contacts.

It will be understood that the contacts 20 and 21 may be thin conductive strips and may have more than one section so as to insure an effective conductive path between the exposed conductive elements.

The outer layer 12 may comprise a plurality of sublayers. For example, if the outer layer of test digestible material dissolves too rapidly or is slightly conductive, a sublayer of insulative dissolvable gelatin may surround the electrodes, the gelatin layer being covered by the other test digestible substance. In this case, the gelatin dissolves only after the outer layer is dissolved.

In my device, I employ a resonant circuit which, when closed, as described above, provides a signal at a particular frequency. I also contemplate a number of such pills being swallowed by the person, each having thicknesses of digestible material of different amounts and having their own distinct resonant circuit. In this way, I can determine the rate and relative amount, or the absence of a particular pancreatic fluid or enzyme which exists for one or more predetermined time periods.

The digestible material is insulative and may include (a) fat to evaluate the enzymatic flow of pancreatic lipase activity, (b) carbohydrate for amylase of pancreatic origin, and (c) protein which would serve as proteolytic substrate for pancreatic trypsin; further, (d) a dissaccharide "test-digestible" material would be used to evaluate the integrity of intestinal lactase and (e) a cholesterol-coated capsule would be employed to test the flow of liver bile. In the latter case, the stimulant would be parenteral injection of cholecystokinin which is known to stimulate contractions of the gall bladder, or the oral ingestion of a lipid.

The stimulant of organ activity would be made in graded amounts so that a dose response curve could be established to determine the best thickness of the "test-digestible" material for each test requested. The speed of dissolution of such material for a given thickness of "test material" surrounding the open connectors would be a reflection or enzyme activity and flow rate, and thereby would indicate obstruction or inadequacy of composition.

In a modification, the stimulants secretin and pancreozymin could be injected into the pancreatic artery directly by catheterizing the celiac arterial axis before ingestion of test capsule.

In the embodiment illustrated in FIG. 3, the capsule 10 has an active electronic circuit 11' meaning that the circuit includes its own power supply. In both of the illustrations of FIG. 1 and FIG. 3, a stimulant is injected intramuscularly or intravascularly by means 30 so as to promote the flow of internal fluid.

In another modification of this invention as illustrated in FIG. 4, an organ can be stimulated by means 30 (FIG. 1) to determine its response as described previously. Thereafter, a second capsule, or series identical to the first, can be swallowed, followed by an injection of an inhibiting substance.

Of course, various sequences may be followed to obtain the desired effect from the stimulant and inhibition operations, and it will be understood that more digestible materials may be used, each material being associated with a different frequency characteristic or other identifiable characteristic.

Typical stimulants for gall bladder activity are:
adrenaline (epinephrine)
pitressin
histamine
mecholyl
cholecystokinin
oral ingestion of fat
Typical inhibitors for gall bladder activity are:
morphine
ergotamine
atropine This procedure allows more precise information concerning the organ function. If an organ is diseased, it may still provide body fluid flow in response to a stimulant. If the time interval for digestion is excessive following the administration of a stimulant, enzyme insufficiency or obstruction is suggested. Here, the transmitter will change state in accordance with this time interval and the insufficiency condition will be identified. In this situation, the administration of an organ inhibitor would cause an even greater time delay for digestion, and change of transmission state. This time delay, when compared to a normal time delay occurring when an inhibitor is administered to a normal organ, can also be used to diagnose insufficiency or obstruction.

For the pancreas, typical stimulants are:
mecholyl
secretin
pancreozymin
Typical inhibitors are:
atropine
morphine In the embodiment of FIG. 5, there is shown two capsules 40 and 45 covered by layers 41 and 42 respectively of different "test-digestible" substance. Each capsule is designed to emit a different identifiable signal such as frequencies $f_1$ and $f_2$ and it will be understood that suitable receiver means responsive to different frequencies will be employed. Further, the outer layers 41 and 42 may have different thicknesses and it will be understood that more than one of such capsules can be used. Each outer layer is designed to detect a different condition and at a different time.

It will be understood that not only can the qualitative condition of an organ be detected, but the quantitative flow can also be approximated. The number of pills swallowed and the thickness of the outer coatings can be varied, and the response to stimulus and inhibit can be charted. It will also be understood that the receiver can be a frequency analyzer providing multiple responses and indications either directly on a multi-channel chart, or by a light buzzer, or any other indicator means, dependent upon the choice of receiver utilized.

Although the terms on and off have been used, in the primary aspect of this invention, the indication of the presence of enzyme activity can be determined by the state of the transmitter. In one embodiment, the transmitter will operate continuously from the time of swallowing, for example, at a frequency $f_a$. Part of the coil of the typical tank circuit of the oscillator may be connected to the contacts embedded in the outer layer. Therefore, when the outer layer is dissolved the effective inductance, hence the resonant frequency, will change, for example to $f_b$.

Therefore, a frequency responsive device having a recording chart or any other multiple continuous indicator can measure the frequency $f_a$ and the time of changeover to the state $f_b$.

In a further embodiment, a plurality of capsules of different thicknesses or different frequencies may be swallowed and a chart made thereof for each capsule, for example, $f_a$–1, $f_a$–2, $f_a$–3 (100 kc, 110 kc, 120 kc) respectively and the same chart will plot the changeover frequencies, for example $f_b$–1, $f_b$–2, $f_b$–3 (200 kc, 210 kc, 220 kc) on a multi-channel type of recorder. The capsules can have different coatings so that the frequency states correspond to the activity of specific enzymes. Many types of chart patterns as well as indicia can be used.

Each capsule is radio (X-Ray) opaque, and multiple capsules may have identifiable shapes — square, triangular, multiangular, S-shaped, etc. Therefore, the position of an identifiable capsule may be determined by X-Ray diagnosis or by ultrasonic locating means. A particular shape will be correlative to a particular frequency. Therefore the position as well as the state of a capsule can be determined.

Of particular interest is the feasibility of dose response curves which can be used to determine abnormal quality as well as abnormal quantity output.

For example, if three capsules are swallowed having a protein, fat, and carbohydrate coating respectively, and each is transmitting at identifiable frequencies, 100 kc, 110 kc, 120 kc, and after suitable time intervals, two of the three frequencies shift (indicating the presence and flow of the secreted enzyme), and there is no frequency shift for the other, then the absence of respective shift indicates an abnormal quality of the organ's secretory activity.

What is claimed is:

1. A process for determining internal blockages to enzyme flow of a subject comprising the steps of providing a swallowable transmitting means having an electrical characteristic thereof modified by a coating of a substance dissolvable by predetermined enzyme secretions;

said electrical characteristic determining the state of said transmitting means;

said transmitting means having electrical contact means embedded in said coating;

causing the subject to swallow said transmitting means;

applying a stimulant to selectively increase enzyme secretions which are active to dissolve said dissolvable substance and to close said contact means;

thereafter determining the state of said transmitting means whereby when said substance is dissolved, the condition of said electrical characteristic can be determined.

2. The process of claim 1 in which the transmitting means has a coating of carbohydrate insulatively covering at least two open connections.

3. The process of claim 1 in which one or more transmitting means are swallowed having different dissolvable coatings insulatively covering respective pairs of open connections, each of said transmitting means having respectively different identifiable frequency characteristics.

4. A method comprising the steps of simultaneously administering a plurality of transponders each having an electronic circuit therein, each of said transponders having standard dissolvable materials digestively responding to different standardized stimulants, said materials respectively causing an electrical characteristic of said transponders to vary as said material is dissolved, injecting said stimulants, and continuously determining the response of said transponders to digestive activity to provide a physiological profile, whereby reference data may be obtained to provide a basis of diagnosing disease.

5. The process of claim 1 in which said coating is selected from the following groups:
pancreas activity: carbohydrate, protein, fat;
liver and gall bladder activity: cholesterol.

6. The process of claim 1 in which said stimulant is selected from the following groups:
for pancreas activity - urecholine, pancreozymin, secretion, mecholyl;
and for liver and gall bladder activity - lipid, cholecystokinin, adrenaline (epinephrine), pitressin, histamine, mecholyl.

7. The process of claim 1, further comprising the step of injecting an inhibitor selected from the following groups:
pancreas - atropine, morphine;
liver and gall bladder - morphine, ergotamine, atropine.

* * * * *